July 9, 1929.	O. R. KOLLER	1,720,490
WEEDER ATTACHMENT FOR HARROWS
Filed Oct. 13, 1927	3 Sheets-Sheet 2
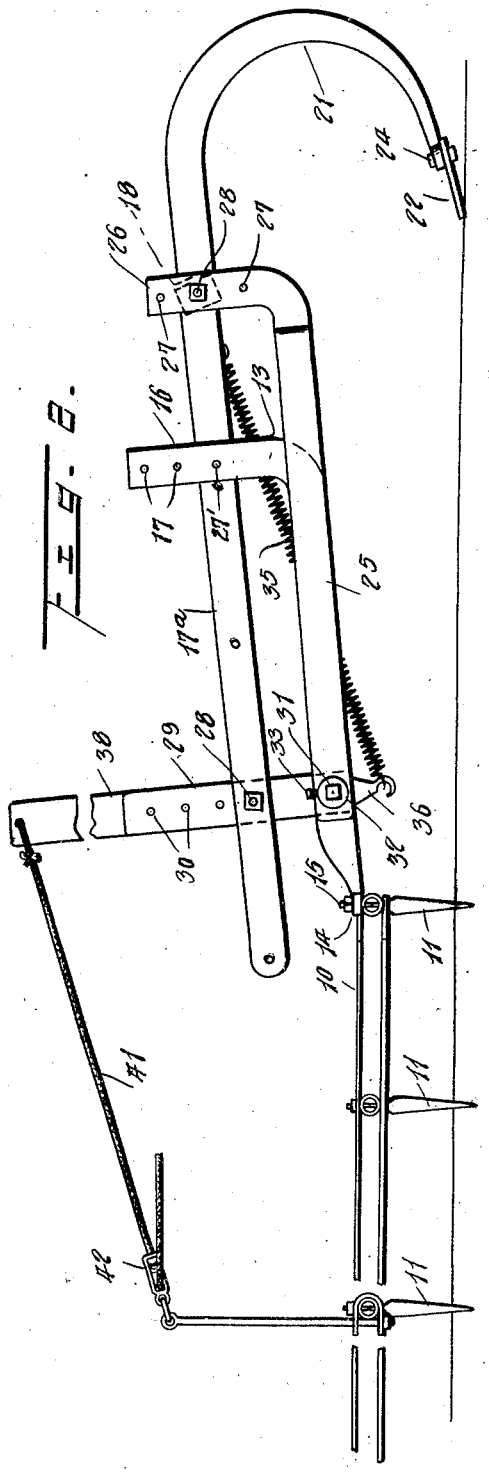
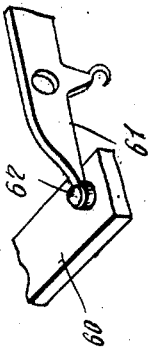
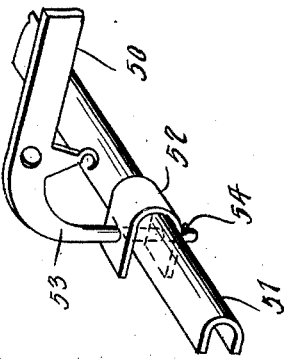
Inventor
O. R. Koller.

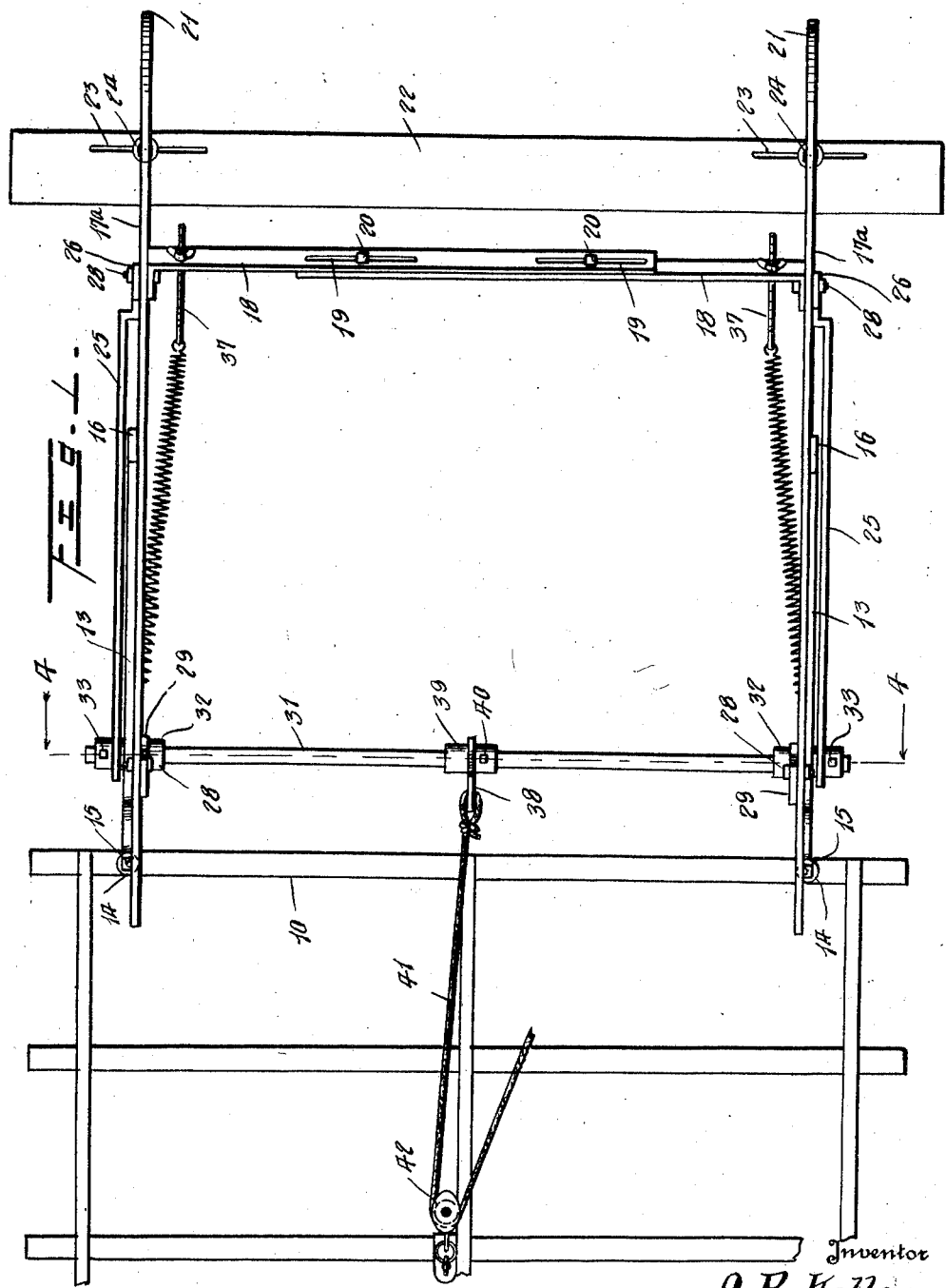

July 9, 1929.                O. R. KOLLER                 1,720,490
                     WEEDER ATTACHMENT FOR HARROWS
                   Filed Oct. 13, 1927       3 Sheets-Sheet 3
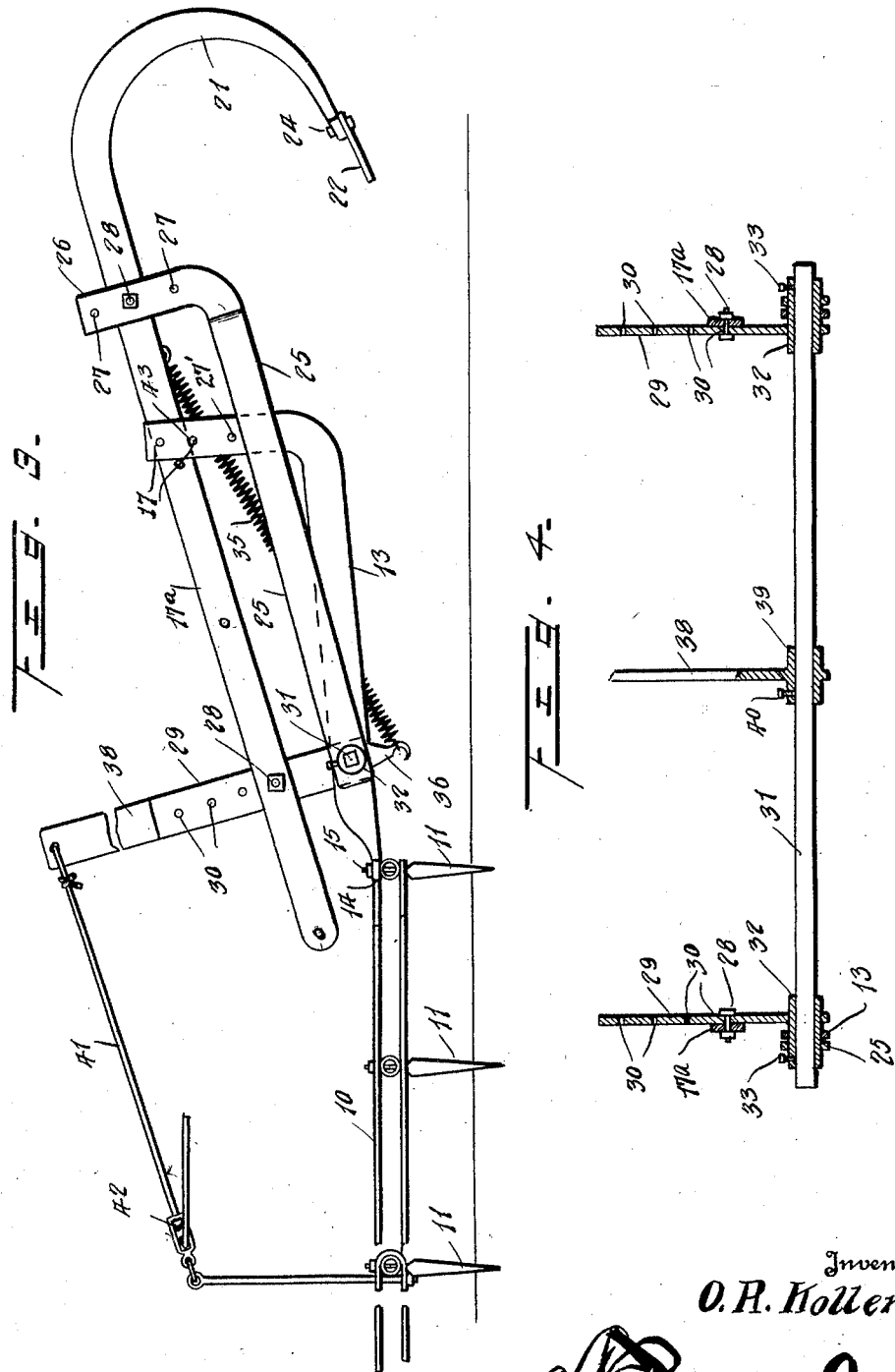
Inventor
O. R. Koller,
By
Attorney Patented July 9, 1929.

UNITED STATES PATENT OFFICE.

OTTO R. KOLLER, OF POMEROY, WASHINGTON.

WEEDER ATTACHMENT FOR HARROWS.

Application filed October 13, 1927. Serial No. 225,947.

This invention relates to a weeder attachment for harrows.

It is generally aimed to provide an exceedingly simple, inexpensive, compact and generally efficient attachment of this character and particularly one wherein the attachment may be adjusted both as to width and as to the depth of the weeder blade, and to provide a construction wherein such blade will remain at the same depth and be urged to that depth after adjustment, and regardless of the angle of adjustment of the harrow teeth.

Various additional objects and advantages will become apparent from a consideration of the description following taken in connection with accompanying drawings illustrating an operative embodiment.

In said drawings:

Figure 1 is a plan view illustrating my improvements in connection with a harrow, the latter being fragmentarily shown;

Figure 2 is a side elevation of the parts of Figure 1;

Figure 3 is a view similar to Figure 2 showing the parts in raised or "dumping" position;

Figure 4 is a longitudinal sectional view taken on the line 4—4 of Figure 1 and along the square shaft;

Figure 5 is a perspective view illustrating means for connecting the attachment to a harrow of the U-bar type; and Figure 6 is a perspective view illustrating attachment of the device to a harrow bar of rectangular form.

Referring specifically to the drawings, 10 designates a harrow of the drag type and which is to be taken as conventional. The type shown in the form of Figures 1 to 4 has its toothed-supporting bars, round or tubular in form as shown at 10, the teeth being designated 11 and adjustable to various angles.

In carrying out my invention, two brackets 13, generally of L-shape are used. Such brackets may be metallic bars having one end flattened as at 14 and secured to one of the bars 10 by securing them to shanks 15 of some of the teeth 11 or by means of other suitable fastenings. The opposite ends of each bar 13 extends upwardly as at 16 and is provided with a series of openings 17.

A weeder frame is provided which consists of side beams 17ª which are joined intermediate their ends by means of links 18 which overlap and are provided with elongated slots 19 and accommodate bolts or other fastenings 20, so that the width of the frame may be adjusted according to the harrow or the work. The rear ends of the bars 17ª are arched or curved downwardly as at 21 and at their lower ends support a weeder blade 22 of any preferred form. In order that the blade may accommodate the adjustment referred to, the same is provided with elongated slots at 23 through which securing bolts 24, carried by the ends of the arches 21, are secured.

The frame of the weeder also consists of side bars as at 25 having upstanding terminals 26 at their rear ends provided with a series of openings 27 therein. Bolts 28 secure the links 18 to the bars 17ª and as well are adapted to be selectively secured in the openings 27 so as to vary the height of the weeder blade 22. Adjacent the forward ends, the bars 17ª by means of bolts 28 are adapted to be secured adjustably as to height to upstanding arms 29 forming part of the weeder frame, such arms having a series of openings 30 to selectively accommodate the bolts 28.

A main shaft, preferably square as shown at 31 is provided with journals or sleeves 32 slidable along the same and held against displacement by means of binding screws 33 which may engage the bar 31. Such sleeves 32 while they slide longitudinally of the bar 31 do not turn independently thereof and rigidly attached to the sleeves 32 are the side bars 25 and the arms 29, such sleeves being journaled in the brackets 13.

In order to hold the rear end or weeder blade at the proper depth in the ground and particularly when the harrow teeth are adjusted at different angles, relatively strong contractile springs, 35 are provided. Such springs may engage hooks 36 depending from the brackets 13 at one end, and eye bolts 37 carried by the links 18.

In order to operate or turn the shaft 31, and thus elevate the weeder device as a unit, in order to "dump", that is move the same from the position of Figure 2 to that of Figure 3, an upstanding arm 38 is attached to the shaft 31. This arm may be rigid on a spool or sleeve 39 and the latter slidable along the shaft 31 but normally held against movement thereon by a binding screw 40. This adjustment enables the arm 38 to be centered according to adjustment of the device as to width. The arm 38 may be operated in any suitable manner in order to raise and lower the frame and blade 22 and for instance may have an operating cable 41 attached to its upper end, and be guided over a pulley or other means 42 anchored on the harrow the device being elevated upon drawing on the cable 41 and lowered by its own weight or gravity when the tension on such cable is released.

The side arms or bars 17ª may be raised to keep the blade 22 elevated when not in use and so maintained by pins 43 applied in openings 17.

The form of harrow to which the device is shown attached in Figures 1 to 4 uses a round bar. In the case of a harrow utilizing a U-bar as in Figure 5, a bracket 50 is used to function similarly to that at 13. The harrow bar is shown at 51 and a bracket 52 straddles the same and has a downwardly extending terminal 53 of the bracket 50 passed through openings in its end and held against accidental detachment by means of a pin 54 passed through an opening in the part 53, or by any other suitable means.

In Figure 6, still another form of bar for the harrow is shown. In this instance it is rectangular and designated 60. The bracket 61 functioning similarly to those at 10 and 50 and secured thereto by means of spikes or any other approved fastenings 62 similarly to the form of Figure 1.

Various changes may be resorted to provided they fall within the spirit and scope of the invention.

I claim as my invention:—

1. A weeder device of the class described comprising attaching brackets, a shaft journaled therein, side arms, arms rising from said shaft, side arms extending from the shaft, means securing the side arms to the second mentioned arms and side arms, and a weeder member carried by the side arms.

2. A weeder device of the class described comprising attaching brackets, a shaft journaled therein, side arms, arms rising from said shaft, side arms extending from the shaft, means securing the side arms to the second mentioned arms and side arms, a weeder member carried by the side arms, and means for varying the position of the side arms relatively to each other and their connection to the weeder member.

3. A weeder of the class described comprising attaching brackets, a square shaft, sleeves on said shaft journaled in said brackets, said sleeves being slidable along the shaft and having means to secure them against sliding movement relatively to the shaft, side arms, means adjustably securing the side arms for movement relatively to each other, a weeder member carried by the side arms, upstanding arms rigid with the sleeves, auxiliary side arms rigid with the sleeves, and means adjustably securing the side arms to the upstanding arms and auxiliary side arms.

4. A weeder of the class described comprising attaching brackets, a square shaft, sleeves on said shaft journaled in said brackets, said sleeves being slidable along the shaft and having means to secure them against sliding movement relatively to the shaft, side arms, means adjustably securing the side arms for movement relatively to each other, a weeder member carried by the side arms, upstanding arms rigid with the sleeves, auxiliary side arms rigid with the sleeves, and means adjustably securing the side arms to the upstanding arms and auxiliary side arms, resilient means connected to the brackets, links adjustably connecting the side arms, and said resilient means also being connected to the links, and an operating arm extending from the square shaft.

5. An attachment of the class described comprising attaching brackets having upstanding terminals provided with openings, a shaft having sleeves journaled in said brackets, upstanding arms rigid with said sleeves, auxiliary side arms rigid with said sleeves, side arms adjustably connected to said upstanding arms and auxiliary side arms and provided with downwardly extending terminals, a weeder blade having elongated slots, means passing through said terminals and said elongated slots to secure the blade to the side arms, openings in said brackets being adapted to accommodate supporting elements to maintain the side arms in elevated position, an operating arm extending from the shaft, links extending from the side arms, said links overlapping and having elongated slots, fastening elements accommodated in said slots, coil springs attached to said links, and hooks on the brackets to which the coil springs are attached.

In testimony whereof I affix my signature.

OTTO R. KOLLER.